US010824356B2

United States Patent
Khan et al.

(10) Patent No.: US 10,824,356 B2
(45) Date of Patent: Nov. 3, 2020

(54) MALLEABLE CONTROLLER FOR STORAGE PROTOCOLS

(71) Applicant: Intel Corporation, Santa Clara, CA (US)

(72) Inventors: Jawad Khan, Portland, OR (US); Akshay Pethe, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 83 days.

(21) Appl. No.: 15/977,335

(22) Filed: May 11, 2018

(65) Prior Publication Data

US 2019/0042132 A1    Feb. 7, 2019

(51) Int. Cl.
*G06F 3/06* (2006.01)
*G06F 12/02* (2006.01)

(52) U.S. Cl.
CPC .......... *G06F 3/0635* (2013.01); *G06F 3/061* (2013.01); *G06F 3/0604* (2013.01); *G06F 3/0679* (2013.01); *G06F 12/02* (2013.01)

(58) Field of Classification Search
CPC .... G06F 3/0604; G06F 3/0635; G06F 3/0658; G06F 3/0659; G06F 3/0673; G06F 3/0679; G06F 13/1668
USPC ...................... 710/38, 74; 711/154
See application file for complete search history.

(56) References Cited

U.S. PATENT DOCUMENTS

| 8,880,802 B1 * | 11/2014 | Krishnamurthy ... G06F 12/0804 711/114 |
| 2013/0067125 A1 * | 3/2013 | Rizzo ...................... G06F 13/12 710/38 |
| 2014/0233385 A1 * | 8/2014 | Beliveau ............... H04L 47/122 370/235 |
| 2017/0177528 A1 | 6/2017 | Harriman et al. |
| 2019/0286581 A1 * | 9/2019 | Benisty ................. G06F 13/364 |

* cited by examiner

*Primary Examiner* — Gary J Portka
(74) *Attorney, Agent, or Firm* — Jordan IP Law, LLC

(57) ABSTRACT

A semiconductor apparatus may include technology to identify two or more types of storage controller traffic, direct a first identified type of storage controller traffic along a fixed processing path, and direct a second type of storage controller traffic along a programmable processing path. Other embodiments are disclosed and claimed.

25 Claims, 9 Drawing Sheets

61 ⟶

| DW0-Byte0<br>Fmt Type | DW0-Byte1<br>TC,Attr,LN,TH | DW0-Byte2<br>TD,EP,Attr,AT,Length | DW0-Byte4<br>Length |
|---|---|---|---|
| DW1-Byte0<br>Req ID | DW1-Byte1<br>Req ID | TAG | DW1-Byte4<br>Byte Enables |
| DW2-Byte0<br>Addr Upper | DW2-Byte1<br>Addr Upper | DW2-Byte2<br>Addr Upper | DW2-Byte4<br>Addr Upper |
| DW3-Byte0<br>Addr Lower | DW3-Byte1<br>Addr Lower | DW3-Byte2<br>Addr Lower | DW3-Byte4<br>Addr Lower, PH |

64 bit MemRd TLP

MALLEABLE CONTROLLER FOR STORAGE PROTOCOLS

TECHNICAL FIELD

Embodiments generally relate to storage systems. More particularly, embodiments relate to a malleable controller for storage protocols.

BACKGROUND

A solid-state drive (SSD) may include non-volatile memory (NVM) technology. Access to the contents of the SSD may be supported with a protocol such as NVM EXPRESS (NVMe), Revision 1.3, published May 2017 (nvmexpress.org).

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Various embodiments described herein may include a memory component and/or an interface to a memory component. Such memory components may include volatile and/or nonvolatile memory. Nonvolatile memory may be a storage medium that does not require power to maintain the state of data stored by the medium. In one embodiment, the memory device may include a block addressable memory device, such as those based on NAND or NOR technologies. A memory device may also include future generation nonvolatile devices, such as a three dimensional (3D) crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product. In particular embodiments, a memory component with non-volatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at jedec.org).

Volatile memory may be a storage medium that requires power to maintain the state of data stored by the medium. Non-limiting examples of volatile memory may include various types of RAM, such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

Figure 1:
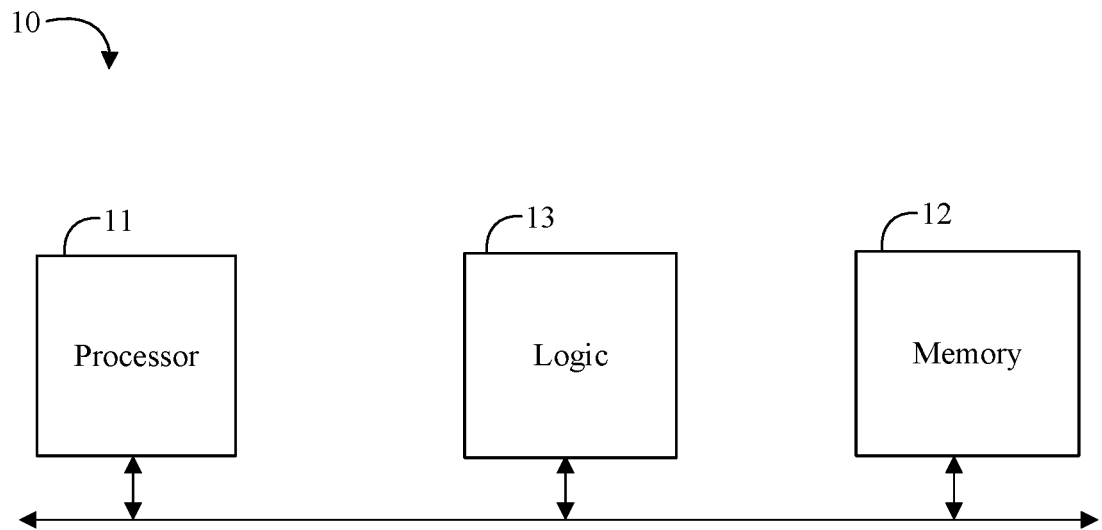
FIG. 1 is a block diagram of an example of an electronic processing system according to an embodiment.

Turning now to FIG. 1, an embodiment of an electronic processing system 10 may include a processor 11, memory 12 communicatively coupled to the processor 11, and logic 13 communicatively coupled to the processor 11 to identify two or more types of storage controller traffic, direct a first identified type of storage controller traffic along a fixed processing path, and direct a second type of storage controller traffic along a programmable processing path. For example, the first identified type of storage controller traffic may correspond to data traffic, and the second identified type of storage controller traffic may correspond to command traffic. In some embodiments, the logic 13 may be configured to identify command traffic based on address and tag information in a transaction layer packet (TLP). For example, the logic 13 may filter an address based on whether the address belongs to a set of filtered addresses, match one or more tags for the filtered address based on a set of tags, and identify command traffic based on the filtered address and matched tag. In some embodiments, the logic 13 may be configured to direct the identified command traffic along the programmable processing path. In any of the embodiments herein, the logic 13 may be provided in a configurable module coupled between a host and a storage device (e.g., as a tailgate configuration instead of being part of an embedded controller). In some embodiments, the logic 13 may be located in, or co-located with, various components, including the processor 11 (e.g., on a same die).

Embodiments of each of the above processor 11, memory 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C # or the like and conventional procedural programming languages, such as the "C" programming language or similar programming languages. For example, the memory 12, persistent storage media, or other system memory may store a set of instructions which when executed by the processor 11 cause the system 10 to implement one or more components, features, or aspects of the system 10 (e.g., the logic 13, identifying the two or more types of storage controller traffic, directing the first identified type of storage controller traffic along the fixed processing path, directing the second type of storage controller traffic along the programmable processing path, etc.).

Figure 2:
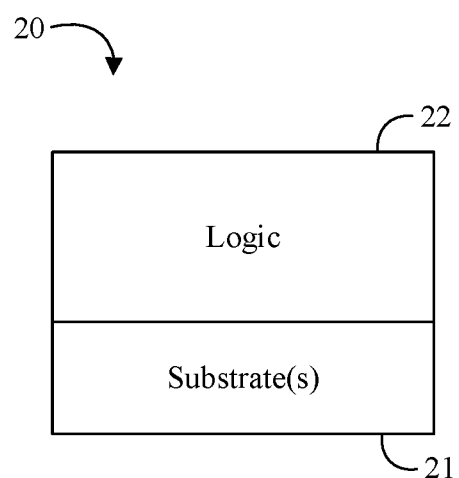
FIG. 2 is a block diagram of an example of a semiconductor package apparatus according to an embodiment.

Turning now to FIG. 2, an embodiment of a semiconductor package apparatus 20 may include one or more substrates 21, and logic 22 coupled to the one or more substrates 21, wherein the logic 22 is at least partly implemented in one or more of configurable logic and fixed-functionality hardware logic. The logic 22 coupled to the one or more substrates 21 may be configured to identify two or more types of storage controller traffic, direct a first identified type of storage controller traffic along a fixed processing path, and direct a second type of storage controller traffic along a programmable processing path. For example, the first identified type of storage controller traffic may correspond to data traffic, and the second identified type of storage controller traffic may correspond to command traffic. In some embodiments, the logic 22 may be configured to identify command traffic based on address and tag information in a TLP. For example, the logic 22 may be configured to filter an address based on whether the address belongs to a set of filtered addresses, match one or more tags for the filtered address based on a set of tags, and identify command traffic based on the filtered address and matched tag. In some embodiments, the logic 22 may be further configured to direct the identified command traffic along the programmable processing path. In any of the embodiments herein, the logic 22 may be configured to intercept storage controller traffic between a host and a storage device (e.g., in a tailgate configuration). In some embodiments, the logic 22 coupled to the one or more substrates 21 may include transistor channel regions that are positioned within the one or more substrates 21.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C # or the like and conventional procedural programming languages, such as the "C" programming language or similar programming languages.

The apparatus 20 may implement one or more aspects of the method 25 (FIGS. 3A to 3B), or any of the embodiments discussed herein. In some embodiments, the illustrated apparatus 20 may include the one or more substrates 21 (e.g., silicon, sapphire, gallium arsenide) and the logic 22 (e.g., transistor array and other integrated circuit/IC components) coupled to the substrate(s) 21. The logic 22 may be implemented at least partly in configurable logic or fixed-functionality logic hardware. In one example, the logic 22 may include transistor channel regions that are positioned (e.g., embedded) within the substrate(s) 21. Thus, the interface between the logic 22 and the substrate(s) 21 may not be an abrupt junction. The logic 22 may also be considered to include an epitaxial layer that is grown on an initial wafer of the substrate(s) 21.

Figure 3A:
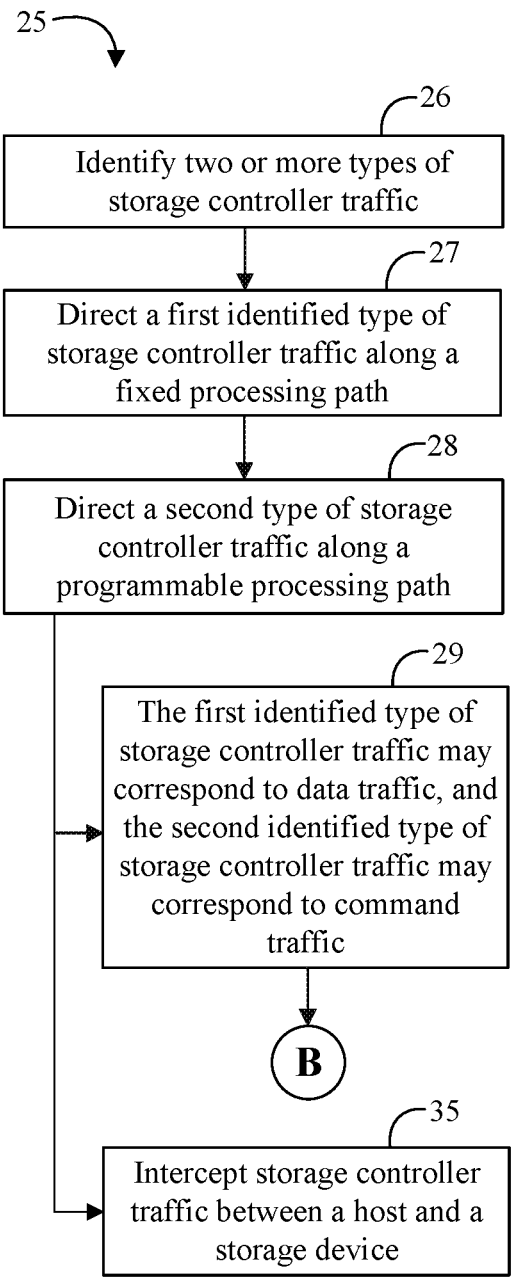
FIGS. 3A to 3B are flowcharts of an example of a method of controlling storage according to an embodiment.
Figure 3B:
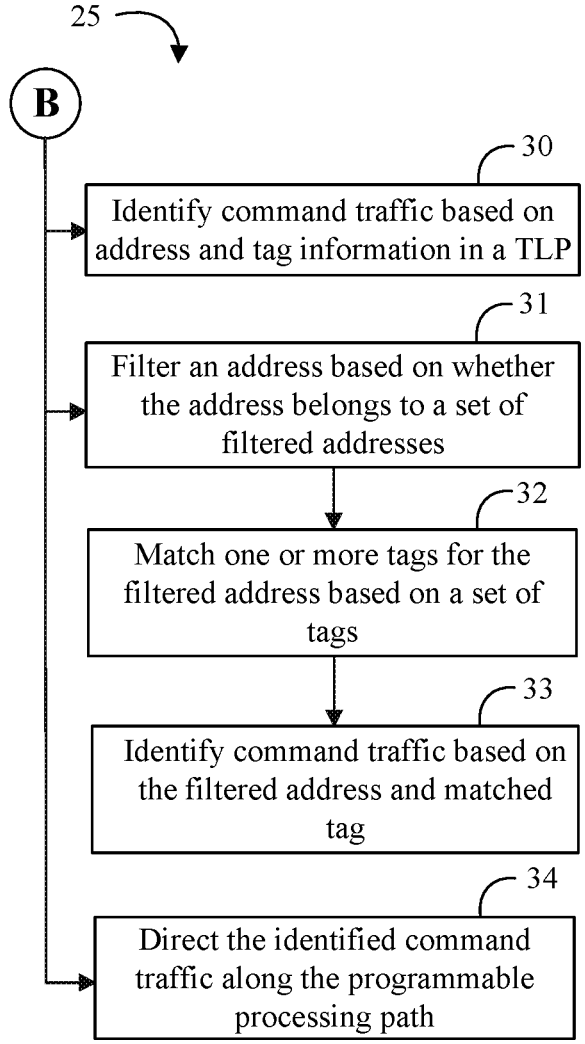

Turning now to FIGS. 3A to 3B, an embodiment of a method 25 of controlling storage may include identifying two or more types of storage controller traffic at block 26, directing a first identified type of storage controller traffic along a fixed processing path at block 27, and directing a second type of storage controller traffic along a programmable processing path at block 28. For example, the first identified type of storage controller traffic may correspond to data traffic, and the second identified type of storage controller traffic may correspond to command traffic at block 29. Some embodiments of the method 25 may include identifying command traffic based on address and tag information in a TLP at block 30. For example, the method 25 may include filtering an address based on whether the address belongs to a set of filtered addresses at block 31, matching one or more tags for the filtered address based on a set of tags at block 32, and identifying command traffic based on the filtered address and matched tag at block 33. The method 25 may also include directing the identified command traffic along the programmable processing path at block 34. Some embodiments of the method 25 may further include intercepting storage controller traffic between a host and a storage device at block 35.

Embodiments of the method 25 may be implemented in a system, apparatus, computer, device, etc., for example, such as those described herein. More particularly, hardware implementations of the method 25 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 25 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C # or the like and conventional procedural programming languages, such as the "C" programming language or similar programming languages.

For example, the method 25 may be implemented on a computer readable medium as described in connection with Examples 20 to 25 below. Embodiments or portions of the method 25 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Some embodiments may advantageously provide malleable NVMe in solid state drive (SSD) controllers. Some applications may benefit from a faster cadence of feature delivery. For example, a proof-of-concept device may provide a requested feature earlier than a production SSD. Some embodiments of a malleable NVMe controller (e.g., flexible, configurable, etc.) may support earlier/faster feature implementation. Some embodiments may provide an architecture which includes a mechanism to enable a software defined NVMe subsystem changes with more flexibility for potential new NVMe feature support, after a fixed-functionality ASIC is in production. Some embodiments may advantageously provide a faster path to realizing new NVMe features without an ASIC spin. Some embodiments may advantageously partition a PERIPHERAL COMPONENT INTERCONNECT EXPRESS (PCIe) sub-system between hardware (HW) and firmware (FW) to provide one or more aspects of a malleable storage controller.

Without being limited to particular implementations, the NVMe protocol may be widely utilized and the NVMe specification may generally continue to add new features. Some conventional controllers may implement the NVMe protocol at a register transfer level (RTL) (e.g., in HW) which fixes most of the features at the time of an RTL freeze, with little opportunity to add new features once the HW has been frozen. However, in some SSD/storage systems, the block that changes the most may be the NVMe protocol block. Some embodiments may advantageously provide improved flexibility for implementing changes to the NVMe protocol in a fast manner, even after the ASIC/RTL is frozen.

Some embodiments may advantageously provide a soft NVMe implementation and leverage several of the NVMe protocol behaviors to provide software (SW) defined behavior. For example, some embodiments may provide low level (e.g., PCIe TLP level) partitioning of the NVMe protocol phases between HW and FW to provide a malleable NVMe protocol block for a SSD controller. Some embodiments may provide a software programmable HW infrastructure which builds on standard NVMe and PCIe mechanisms and allows updates to the NVMe system using FW only.

Conventional NVMe implementations are mostly static, with little chance for intercepting new HW-based NVMe features after the RTL is frozen. For a new feature, customers may have to wait for the next SSD controller which implements the new feature (e.g., which may be several years out). Some embodiments may allow delivery of new features on existing RTL using FW only, with appropriate HW/FW partitioning as described herein. For example, processing all TLPs using a processor may not be feasible at speed (e.g., or may not be practical in terms of cost, size, etc.). Some embodiments may separate NVMe command and data traffic at the TLP level and allow inspection of only those TLP packets which belong to NVMe command and configuration traffic. In some embodiments, the bulk of data traffic TLPs may be bypassed. Advantageously, some embodiments may reduce the processing overhead significantly and provide a soft NVMe which otherwise would not have been possible/practical.

Figure 4:
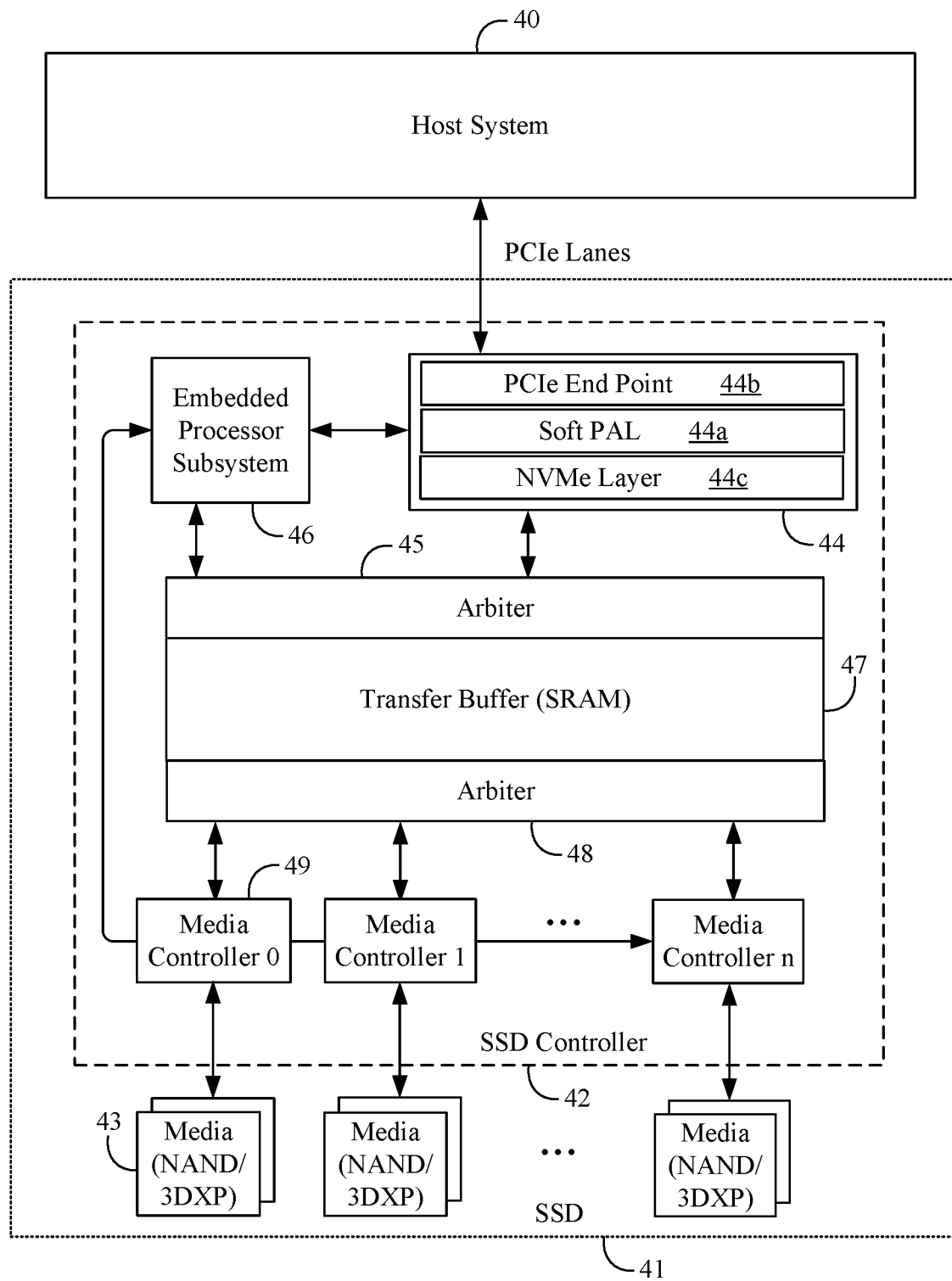
FIG. 4 is a block diagram of another example of an electronic processing system according to an embodiment.

Turning now to FIG. 4, an embodiment of an electronic processing system 38 may include a host system 40 communicatively coupled via PCIe lanes to a SSD 41. The SSD 41 may include a SSD controller 42 communicatively coupled to one or more nonvolatile media 43 (e.g., NAND, INTEL 3DXPOINT, etc.). The SSD controller 42 may include a PCIe stack 44 coupled between the PCIe lanes and a first arbiter 45. The SSD controller 42 may further include an embedded processor subsystem 46 communicatively coupled to the PCIe stack 44 and the first arbiter 45. The SSD controller 42 may further include a transfer buffer 47 (e.g., SRAM) coupled between the first arbiter 45 and a second arbiter 48. The SSD controller 42 may also include one or more media controllers 49 respectively coupled between the second arbiter 48 and the one or more nonvolatile media 43. Each of the one or more media controllers 49 may also be communicatively coupled to the embedded processor subsystem 46.

Advantageously, some embodiments of the PCIe stack 44 may include a soft PCIe adaptation layer (PAL) 44a coupled between a PCIe end point layer 44b and an NVMe layer 44c. In some embodiments, the soft PAL 44a may include logic to identify two or more types of storage controller traffic, direct a first identified type of storage controller traffic along a fixed processing path (e.g., bypassing the embedded processor subsystem 46), and direct a second type of storage controller traffic along a programmable processing path (e.g., through the embedded processor subsystem 46). For example, the first identified type of storage controller traffic may correspond to data traffic, and the second identified type of storage controller traffic may correspond to command traffic. In some embodiments, the soft PAL 44a may include logic to identify command traffic based on address and tag information in a TLP. For example, the soft PAL 44a may include logic to filter an address based on whether the address belongs to a set of filtered addresses, match one or more tags for the filtered address based on a set of tags, and identify command traffic based on the filtered address and matched tag. In some embodiments, the soft PAL 44a may also include logic to direct the identified command traffic through the embedded processor subsystem 46. In some embodiments, the embedded processor subsystem 46 may also be used to manage internal functions of the SSD controller 42.

In some PCIe subsystems, there may be three main types of traffic including, configuration (CFG) traffic, memory mapped input/output (MMIO) traffic, and direct memory access (DMA) traffic. CFG traffic may be utilized to configure the device and may target the PCIe configuration space. MMIO traffic may be utilized for device specific configuration. For example, MMIO traffic may be addressed via the memory addresses exposed via the base address register (BAR) and may always be from the host system towards the endpoint. DMA traffic may be initiated by the device towards the host memory for data transfers. The CFG traffic may configure the PCIe specification mandated registers and may bind the appropriate device driver. The MMIO traffic may typically be device driver initiated for initial device setup (e.g., for NVMe controller setup) and during regular operation. CFG reads and writes may target an area inside the device that is addressed by the bus, device, function number, and a register number. MMIO traffic may target memory inside the device mapped to system address space. DMA traffic may target the host memory. In some embodiments, CFG traffic and select MMIO traffic may be considered command traffic, while DMA traffic may be considered data traffic.

Figure 5:
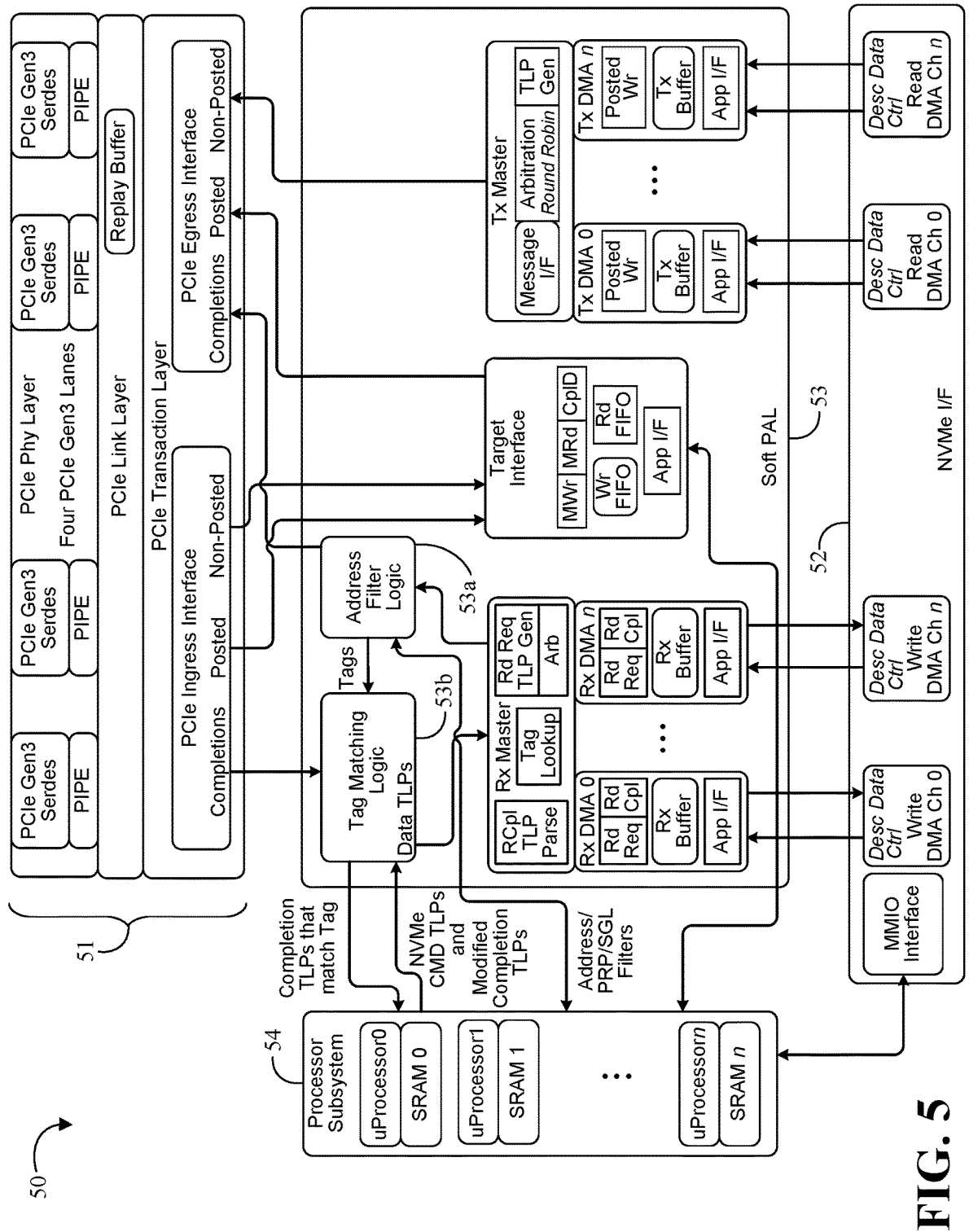
FIG. 5 is a block diagram of an example of a malleable controller according to an embodiment.

Turning now to FIG. 5, an embodiment of a malleable controller 50 may include a PCIe end point layer 51, an NVMe interface (I/F) layer 52, and a soft PAL 53 coupled between the PCIe end point layer 51 and the NVMe OF layer 52. The controller 50 may further include a processor subsystem 54 coupled to the soft PAL 53 and the NVMe OF layer 52 (e.g., through a MMIO interface). The soft PAL 53 may include address filter logic 53a and tag matching logic 53b to identify CFG, MMIO, and DMA traffic. The soft PAL 53 may direct the DMA traffic along a fixed processing path (e.g., through the receiver (Rx) master to the NVMe OF layer 52, bypassing the processor subsystem 54). The soft PAL 53 may direct all of the CFG traffic and select MMIO traffic along a programmable processing path (e.g., through the processor subsystem 54). The address filter logic 53a and tag matching logic 53b may identify the CFG and select MMIO traffic based on address and tag information in a TLP. For example, the address filter logic 53a may filter TLP addresses based on whether the TLP address belongs to a set of filtered addresses. The tag matching logic 53b may then match one or more tags for the filtered address based on a set of tags. The identified controller traffic which corresponds to the filtered addresses and matched tags may be directed to the processor subsystem 54, while the other traffic may be directed along the fixed processing path.

In some embodiments, the processor subsystem 54 may include an embedded processor along with associated DRAM/SRAM. Advantageously, the processor subsystem 54 may provide a programmable path to provide flexibility and/or support the addition of new controller features between hardware revisions. In some embodiments, the processor subsystem 54 may be integrated with an embedded processor subsystem on the SSD device (e.g., which may also manage internal functions of the SSD controller). Alternatively, or additionally, some embodiments may provide a separate processor subsystem 54 which may provide more reliable and consistent performance (e.g., a dedicated pool of processor(s) for the PCIe subsystem). In the illustrated embodiment of FIG. 5, the processor subsystem 54 may include many small processors, each with associated SRAM.

In other controllers, configuration packets (e.g., CFG or MMIO traffic) are routed to dedicated registers provided by the PCI function, which makes the implementation rigid. Some embodiments may route configuration packets to the processor subsystem 54 which advantageously provides a soft MIMO space and may flexibly respond to the host configuration requests such as BAR allocation, other NVMe specific registers, etc. Routing selective packets to the processor subsystem 54 may advantageously change how the host sees underlying PCIe device. For example, some embodiments may trap all CFG traffic and select MMIO traffic to the processor subsystem 54 and provide TLP completions as needed for particular implementations and/or feature sets. Some embodiments may advantageously present any device to the host that is needed (e.g., including a new device after the device is installed/deployed) by changing software and/or firmware in the malleable controller 50.

Advantageously, some embodiments selectively provide the soft functionality. For example, it may not be possible or practical for the processor subsystem 54 to inspect every PCIe TLP (e.g., there may be too much PCIe traffic to handle effectively while providing sufficient throughput). Some embodiments may advantageously configure the address filter logic 53a and tag matching logic 53b to capture all CFG packets, all packets which are related to NVMe configuration commands, and all TLPs packets which are related to other NVMe commands, physical region pages (PRPs), and scatter/gather lists (SGLs), and send the same to the processor subsystem 54. All other data TLPs for DMA traffic may be routed to downstream blocks to provide high throughput.

Figure 6A:
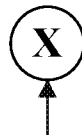
FIG. 6A is an illustrative diagram of a memory read transaction layer packet according to an embodiment.
Figure 6B:
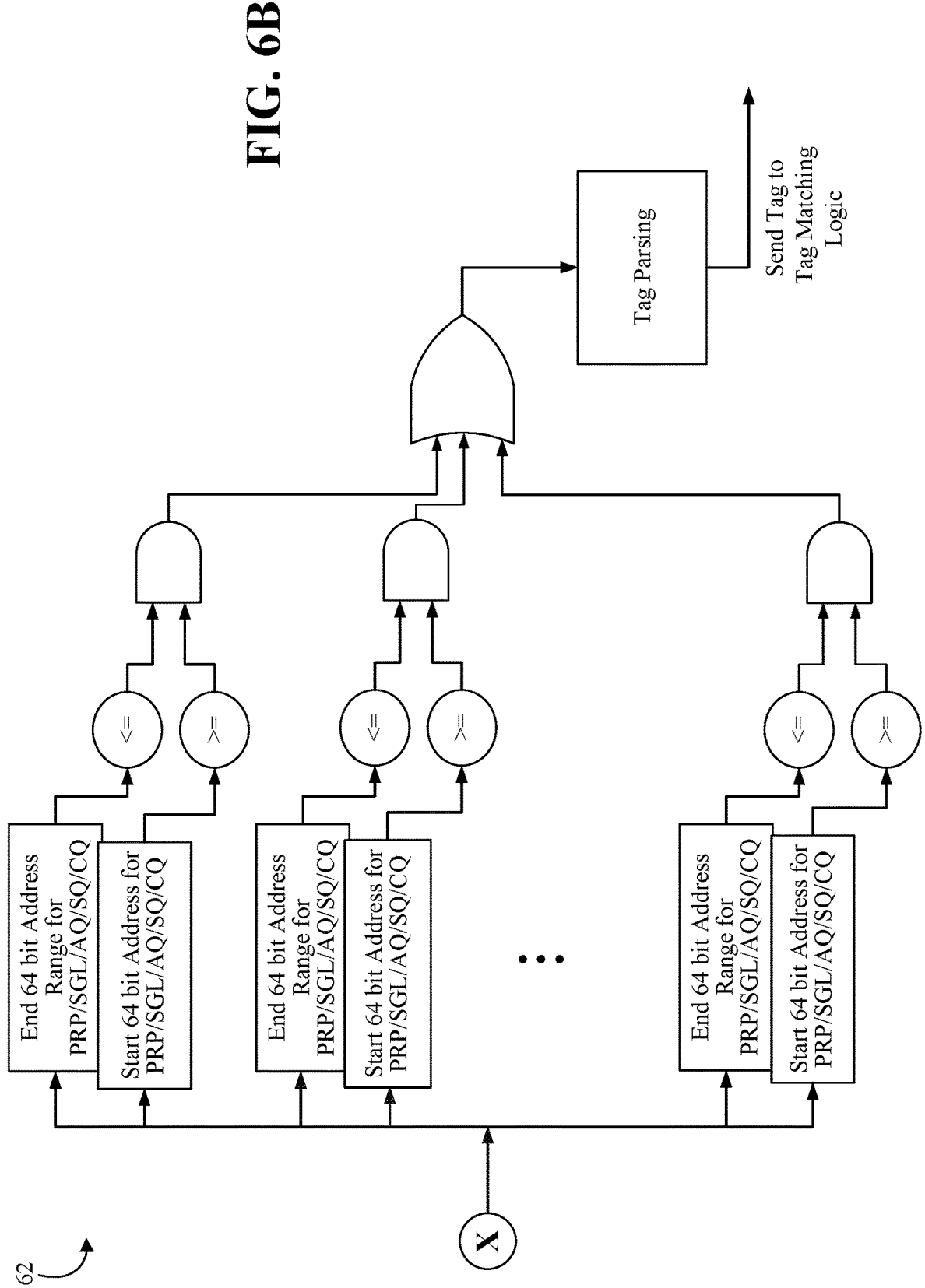
FIG. 6B is a block diagram of an example of address filter logic according to an embodiment.

Turning now to FIGS. 6A and 6B, an embodiment of a 64-bit memory read (MemRd) TLP 61 may include data, address and tag information. For example, the bolded fields may correspond to address and tag information while the other fields may correspond to data information. An embodiment of address filter logic 62 may be programmed with address ranges for a submission queue (SQ), an admin queue (AQ), a completion queue (CQ), PRPs, SGLs, etc., to be checked by the processor subsystem, after the NVMe queues are set up. For example, the address filter logic 62 may determine if the address of the TLP 61 is between any of the start and end ranges for the programmed addresses. If so, the address filter logic 62 may enable tag parsing and send the tag to the tag matching logic. The tag parsing block keeps a record of PCIe tags of the memory reads initiated by the SSD towards the host memory. This block inspects all the PCIe completion TLPs coming from the host towards the SSD and only targets those which contain tags that are marked to be tracked.

Because all NVMe transactions are initiated by the SSD, the address filter logic 62 may keep track of NVMe commands, PRPs, and/or SGLs going out of the SSD. For example, the address filter logic 62 may snoop for those TLPs which contain addresses which correspond to the NVMe AQ, SQ, and CQ, as well tags associated with PRP and SGL requests. The logic 62 may then provide all those tags associated with those transactions to the tag matching logic (e.g., which may capture incoming TLPs and provide them to the processor subsystem for processing).

Figure 7A:
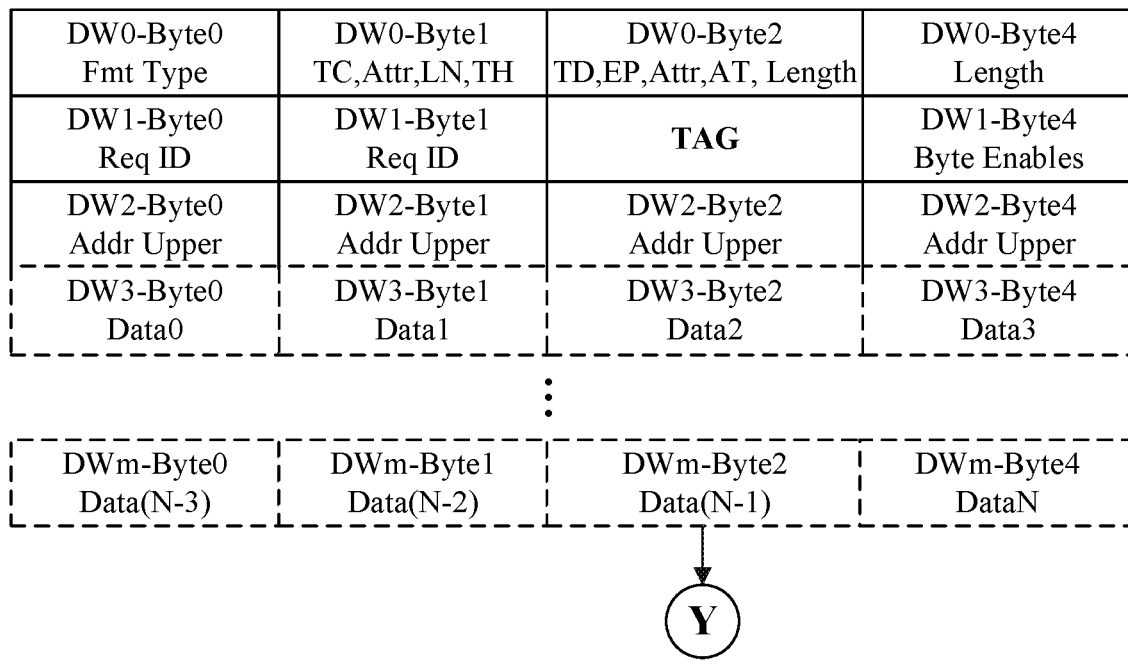
FIG. 7A is an illustrative diagram of a completion transaction layer packet according to an embodiment.
Figure 7B:
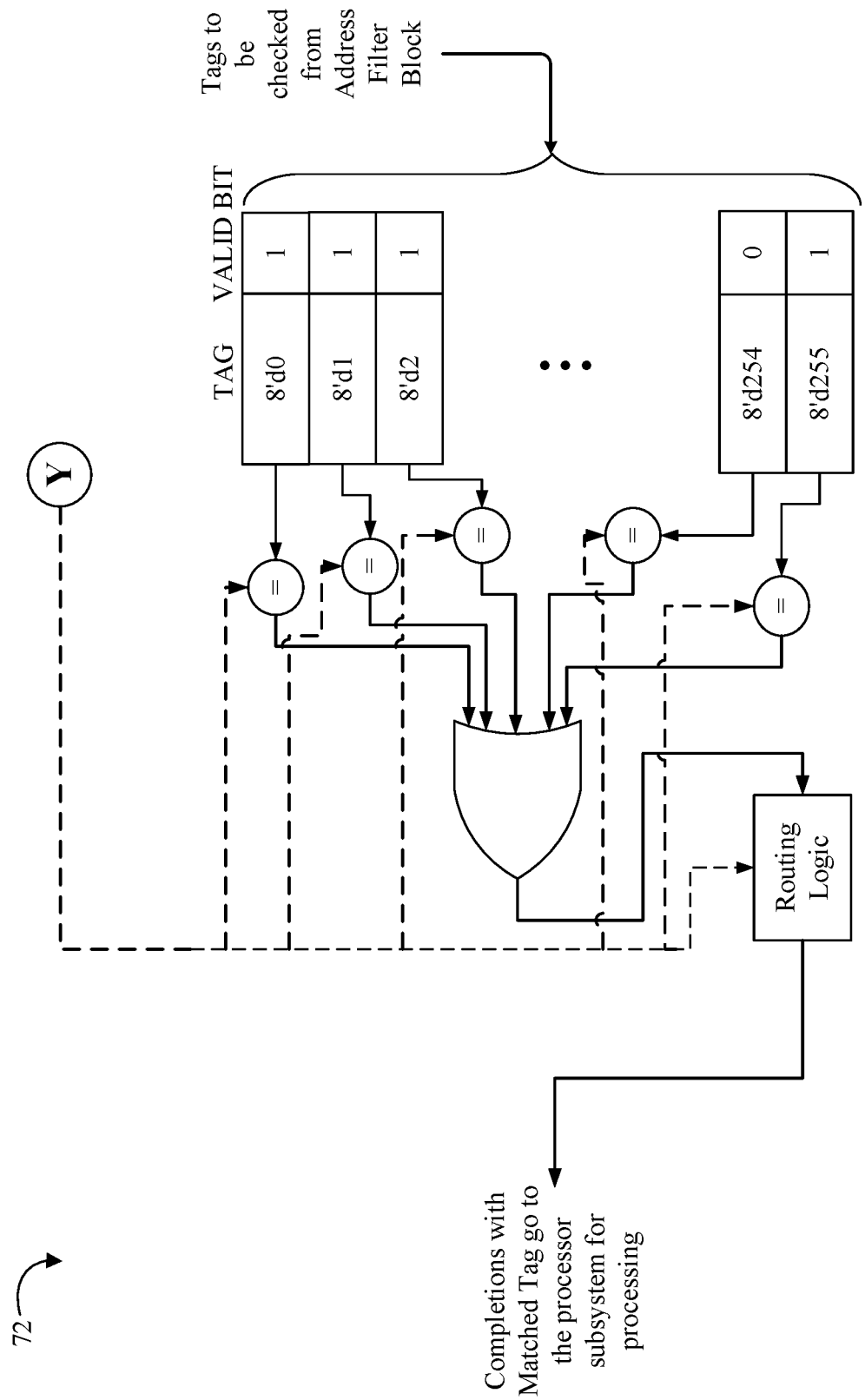
FIG. 7B is a block diagram of an example of tag matching logic according to an embodiment.

Turning now to FIGS. 7A to 7B, an embodiment of a completion TLP 71 may include a unique tag (illustrated as bolded in FIG. 7A). For example, every PCIe transaction may contain a unique tag. An embodiment of tag matching logic 72 may work in concert with the address filter logic. For example, the tag matching logic 72 may keep track of the tags submitted for filtering through the address filter logic. If a tag matches to the one provided by the address filter logic, the tag matching logic 72 may send those packets to the processor subsystem for processing. The processor can then choose to modify the data as per its configuration before sending it to the SSD. This ability to intercept the traffic between the host and the SSD and modify it in a configurable way is what makes this controller malleable. The comparison is between the PCIe tags marked to be tagged with the "Valid" bit set to 1 and the incoming Tags in the completion TLPs.

Figure 8:
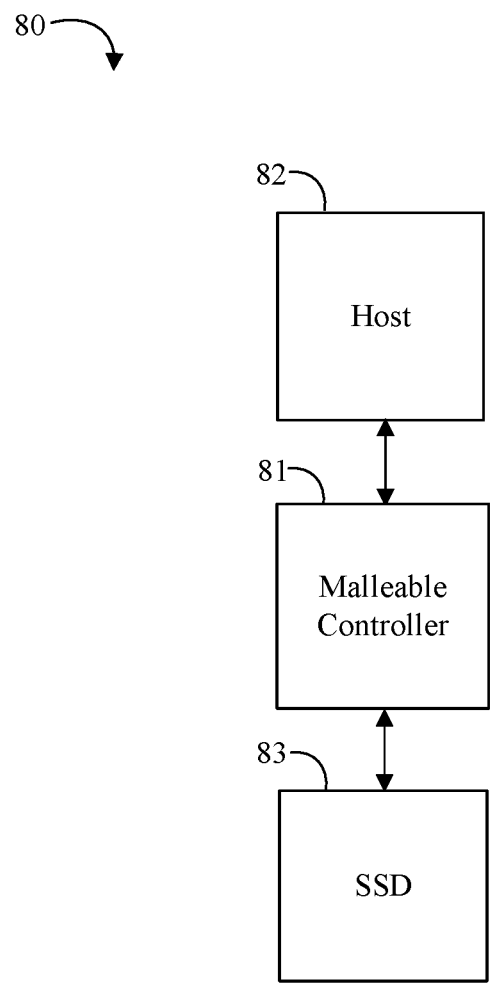
FIG. 8 is a block diagram of another example of an electronic processing system according to an embodiment.

Turning now to FIG. 8, an electronic processing system 80 may include a malleable controller 81 coupled between a host 82 and a SSD 83. For example, the malleable controller 81 may be implemented as a FPGA or other configurable device in a tailgate or interposer arrangement. For example, the SSD 83 may include a conventional SSD controller which supports a built-in set of NVMe commands/features, but may not support one or more features which is desired or needed for the system 80. Rather than an integrated SSD controller, some embodiments may provide a tailgate arrangement in which the malleable controller 81 is implemented as an auxiliary device which is inserted in front of another SSD controller. The malleable controller 81 may talk to the host 82 on one side and the SSD 83 on the other, and intercept the traffic therebetween to provide one or more aspects of the various embodiments described herein. The malleable controller 81 may be logically transparent to the host 82 and the controller 81 may modify the traffic flowing between the host 82 and the SSD 83. For example, the malleable controller 81 may include soft NVMe functionality as described herein while the SSD 83 may be utilized with no changes. For example, the malleable controller 81 may include an embedded processor and provide a high degree of flexibility/configurability.

Additional Notes and Examples

Example 1 may include an electronic processing system, comprising a processor, memory communicatively coupled to the processor, and logic communicatively coupled to the processor to identify two or more types of storage controller traffic, direct a first identified type of storage controller traffic along a fixed processing path, and direct a second type of storage controller traffic along a programmable processing path.

Example 2 may include the system of Example 1, wherein the first identified type of storage controller traffic corresponds to data traffic, and wherein the second identified type of storage controller traffic corresponds to command traffic.

Example 3 may include the system of Example 2, wherein the logic is further to identify command traffic based on address and tag information in a transaction layer packet.

Example 4 may include the system of Example 2, wherein the logic is further to filter an address based on whether the address belongs to a set of filtered addresses, match one or more tags for the filtered address based on a set of tags, and identify command traffic based on the filtered address and matched tag.

Example 5 may include the system of Example 4, wherein the logic is further to direct the identified command traffic along the programmable processing path.

Example 6 may include the system of any of Examples 1 to 5, wherein the logic is provided in a configurable module coupled between a host and a storage device.

Example 7 may include a semiconductor package apparatus, comprising one or more substrates, and logic coupled to the one or more substrates, wherein the logic is at least partly implemented in one or more of configurable logic and fixed-functionality hardware logic, the logic coupled to the one or more substrates to identify two or more types of storage controller traffic, direct a first identified type of storage controller traffic along a fixed processing path, and direct a second type of storage controller traffic along a programmable processing path.

Example 8 may include the apparatus of Example 7, wherein the first identified type of storage controller traffic corresponds to data traffic, and wherein the second identified type of storage controller traffic corresponds to command traffic.

Example 9 may include the apparatus of Example 8, wherein the logic is further to identify command traffic based on address and tag information in a transaction layer packet.

Example 10 may include the apparatus of Example 8, wherein the logic is further to filter an address based on whether the address belongs to a set of filtered addresses, match one or more tags for the filtered address based on a set of tags, and identify command traffic based on the filtered address and matched tag.

Example 11 may include the apparatus of Example 10, wherein the logic is further to direct the identified command traffic along the programmable processing path.

Example 12 may include the apparatus of any of Examples 7 to 11, wherein the logic is further to intercept storage controller traffic between a host and a storage device.

Example 13 may include the apparatus of any of Examples 7 to 12, wherein the logic coupled to the one or more substrates includes transistor channel regions that are positioned within the one or more substrates.

Example 14 may include a method of controlling storage, comprising identifying two or more types of storage controller traffic, directing a first identified type of storage controller traffic along a fixed processing path, and directing a second type of storage controller traffic along a programmable processing path.

Example 15 may include the method of Example 14, wherein the first identified type of storage controller traffic corresponds to data traffic, and wherein the second identified type of storage controller traffic corresponds to command traffic.

Example 16 may include the method of Example 15, further comprising identifying command traffic based on address and tag information in a transaction layer packet.

Example 17 may include the method of Example 15, further comprising filtering an address based on whether the address belongs to a set of filtered addresses, matching one or more tags for the filtered address based on a set of tags, and identifying command traffic based on the filtered address and matched tag.

Example 18 may include the method of Example 17, further comprising directing the identified command traffic along the programmable processing path.

Example 19 may include the method of any of Examples 14 to 18, further comprising intercepting storage controller traffic between a host and a storage device.

Example 20 may include at least one computer readable storage medium, comprising a set of instructions, which when executed by a computing device, cause the computing device to identify two or more types of storage controller traffic, direct a first identified type of storage controller traffic along a fixed processing path, and direct a second type of storage controller traffic along a programmable processing path.

Example 21 may include the at least one computer readable storage medium of Example 20, wherein the first identified type of storage controller traffic corresponds to data traffic, and wherein the second identified type of storage controller traffic corresponds to command traffic.

Example 22 may include the at least one computer readable storage medium of Example 21, comprising a further set of instructions, which when executed by the computing device, cause the computing device to identify command traffic based on address and tag information in a transaction layer packet.

Example 23 may include the at least one computer readable storage medium of Example 21, comprising a further set of instructions, which when executed by the computing device, cause the computing device to filter an address based on whether the address belongs to a set of filtered addresses, match one or more tags for the filtered address based on a set of tags, and identify command traffic based on the filtered address and matched tag.

Example 24 may include the at least one computer readable storage medium of Example 23, comprising a further set of instructions, which when executed by the computing device, cause the computing device to directing the identified command traffic along the programmable processing path.

Example 25 may include the at least one computer readable storage medium of any of Examples 20 to 24, comprising a further set of instructions, which when executed by the computing device, cause the computing device to intercepting storage controller traffic between a host and a storage device.

Example 26 may include a malleable controlling apparatus, comprising means for identifying two or more types of storage controller traffic, means for directing a first identified type of storage controller traffic along a fixed processing path, and means for directing a second type of storage controller traffic along a programmable processing path.

Example 27 may include the apparatus of Example 26, wherein the first identified type of storage controller traffic corresponds to data traffic, and wherein the second identified type of storage controller traffic corresponds to command traffic.

Example 28 may include the apparatus of Example 27, further comprising means for identifying command traffic based on address and tag information in a transaction layer packet.

Example 29 may include the apparatus of Example 27, further comprising means for filtering an address based on whether the address belongs to a set of filtered addresses, matching one or more tags for the filtered address based on a set of tags, and identifying command traffic based on the filtered address and matched tag.

Example 30 may include the apparatus of Example 29, further comprising means for directing the identified command traffic along the programmable processing path.

Example 31 may include the apparatus of any of Examples 26 to 30, further comprising means for intercepting storage controller traffic between a host and a storage device.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An electronic processing system, comprising:
a processor;
memory communicatively coupled to the processor; and
logic communicatively coupled to the processor to:
identify two or more types of storage controller traffic,
direct a first identified type of storage controller traffic along a fixed processing path, wherein the first identified type of storage controller traffic corresponds to data traffic,
direct a second type of storage controller traffic along a programmable processing path, wherein the second identified type of storage controller traffic corresponds to command traffic,
identify the command traffic based on address and tag information in a transaction layer packet,
filter an address based on whether the address belongs to a set of filtered addresses,
match one or more tags for the filtered address based on a set of tags, and
identify the command traffic based on the filtered address and the matched one or more tags.

2. The system of claim 1, wherein the logic is further to:
direct the identified command traffic along the programmable processing path.

3. The system of claim 1, wherein the logic is provided in a configurable module coupled between a host and a storage device.

4. A semiconductor package apparatus, comprising:
one or more substrates; and
logic coupled to the one or more substrates, wherein the logic is at least partly implemented in one or more of configurable logic and fixed-functionality hardware logic, the logic coupled to the one or more substrates to:
identify two or more types of storage controller traffic associated with a solid state drive controller having a malleable non-volatile memory express layer, wherein the malleable non-volatile memory express layer is implemented via a Peripheral Component Interconnect Express interface that is partitioned between hardware and firmware to update the malleable non-volatile memory express layer using only firmware,
direct a first identified type of storage controller traffic along a fixed processing path, and
direct a second type of storage controller traffic along a programmable processing path.

5. The apparatus of claim 4, wherein the first identified type of storage controller traffic corresponds to data traffic, and wherein the second identified type of storage controller traffic corresponds to command traffic.

6. The apparatus of claim 5, wherein the logic is further to:
identify command traffic based on address and tag information in a transaction layer packet.

7. The apparatus of claim 5, wherein the logic is further to:
filter an address based on whether the address belongs to a set of filtered addresses;
match one or more tags for the filtered address based on a set of tags; and
identify command traffic based on the filtered address and matched tag.

8. The apparatus of claim 7, wherein the logic is further to:
direct the identified command traffic along the programmable processing path.

9. The apparatus of claim 4, wherein the logic is further to:
intercept storage controller traffic between a host and a storage device.

10. The apparatus of claim 4, wherein the logic coupled to the one or more substrates includes transistor channel regions that are positioned within the one or more substrates.

11. A method of controlling storage, comprising:
identifying two or more types of storage controller traffic associated with a solid state drive controller having a malleable non-volatile memory express layer, wherein the malleable non-volatile memory express layer is implemented via a Peripheral Component Interconnect Express interface that is partitioned between hardware and firmware to update the malleable non-volatile memory express layer using only firmware;
directing a first identified type of storage controller traffic along a fixed processing path; and
directing a second type of storage controller traffic along a programmable processing path.

12. The method of claim 11, wherein the first identified type of storage controller traffic corresponds to data traffic, and wherein the second identified type of storage controller traffic corresponds to command traffic.

13. The method of claim 12, further comprising:
identifying command traffic based on address and tag information in a transaction layer packet.

14. The method of claim 12, further comprising:
filtering an address based on whether the address belongs to a set of filtered addresses;
matching one or more tags for the filtered address based on a set of tags; and
identifying command traffic based on the filtered address and matched tag.

15. The method of claim 14, further comprising:
directing the identified command traffic along the programmable processing path.

16. The method of claim 11, further comprising:
intercepting storage controller traffic between a host and a storage device.

17. At least one computer readable storage medium, comprising a set of instructions, which when executed by a computing device, cause the computing device to:
identify two or more types of storage controller traffic associated with a solid state drive controller having a malleable non-volatile memory express layer, wherein the malleable non-volatile memory express layer is implemented via a Peripheral Component Interconnect Express interface that is partitioned between hardware and firmware to update the malleable non-volatile memory express layer using only firmware;
direct a first identified type of storage controller traffic along a fixed processing path; and
direct a second type of storage controller traffic along a programmable processing path.

18. The at least one computer readable storage medium of claim 17, wherein the first identified type of storage controller traffic corresponds to data traffic, and wherein the second identified type of storage controller traffic corresponds to command traffic.

19. The at least one computer readable storage medium of claim 18, comprising a further set of instructions, which when executed by the computing device, cause the computing device to:
identify command traffic based on address and tag information in a transaction layer packet.

20. The at least one computer readable storage medium of claim 18, comprising a further set of instructions, which when executed by the computing device, cause the computing device to:
filter an address based on whether the address belongs to a set of filtered addresses;
match one or more tags for the filtered address based on a set of tags; and
identify command traffic based on the filtered address and matched tag.

21. The at least one computer readable storage medium of claim 20, comprising a further set of instructions, which when executed by the computing device, cause the computing device to:
directing the identified command traffic along the programmable processing path.

22. The at least one computer readable storage medium of claim 17, comprising a further set of instructions, which when executed by the computing device, cause the computing device to:
intercepting storage controller traffic between a host and a storage device.

23. The apparatus of claim 4, wherein the solid state drive controller comprises a peripheral component interconnect express stack, wherein the peripheral component interconnect express stack comprises a soft peripheral component interconnect express adaptation layer coupled between a peripheral component interconnect express end point layer and the malleable non-volatile memory express layer, and wherein the soft peripheral component interconnect express adaptation layer is to bypass an embedded processor subsystem when directing the storage controller traffic along the fixed processing path.

24. The method of claim 11, wherein the solid state drive controller comprises a peripheral component interconnect express stack, wherein the peripheral component interconnect express stack comprises a soft peripheral component interconnect express adaptation layer coupled between a peripheral component interconnect express end point layer and the malleable non-volatile memory express layer, and wherein the soft peripheral component interconnect express adaptation layer is to bypass an embedded processor subsystem when directing the storage controller traffic along the fixed processing path.

25. The at least one computer readable storage medium of claim 17, wherein the solid state drive controller comprises a peripheral component interconnect express stack, wherein the peripheral component interconnect express stack comprises a soft peripheral component interconnect express adaptation layer coupled between a peripheral component interconnect express end point layer and the malleable non-volatile memory express layer, and wherein the soft peripheral component interconnect express adaptation layer is to bypass an embedded processor subsystem when directing the storage controller traffic along the fixed processing path.

* * * * *